United States Patent
O'Donoghue et al.

(10) Patent No.: US 9,703,760 B2
(45) Date of Patent: Jul. 11, 2017

(54) PRESENTING EXTERNAL INFORMATION RELATED TO PRESELECTED TERMS IN EBOOK

(71) Applicant: RAKUTEN KOBO INC., Toronto (CA)

(72) Inventors: Tony O'Donoghue, Toronto (CA); James Wu, Toronto (CA)

(73) Assignee: RAKUTEN KOBO INC., Toronto (CA)

(*) Notice: Subject to any disclaimer, the term of this patent is extended or adjusted under 35 U.S.C. 154(b) by 302 days.

(21) Appl. No.: 13/964,739

(22) Filed: Aug. 12, 2013

(65) Prior Publication Data

US 2015/0046782 A1 Feb. 12, 2015

(51) Int. Cl.
| | | |
|---|---|---|
| *G06F 17/22* | (2006.01) | |
| *G06F 17/21* | (2006.01) | |
| *G06F 17/24* | (2006.01) | |
| *G06F 17/30* | (2006.01) | |
| *G06F 17/25* | (2006.01) | |
| *G06T 11/60* | (2006.01) | |

(52) U.S. Cl.
CPC ........ *G06F 17/2235* (2013.01); *G06F 17/211* (2013.01); *A63F 2300/5553* (2013.01); *A63F 2300/6623* (2013.01); *G06F 17/24* (2013.01); *G06F 17/241* (2013.01); *G06F 17/248* (2013.01); *G06F 17/25* (2013.01); *G06F 17/30882* (2013.01); *G06T 11/60* (2013.01)

(58) Field of Classification Search
CPC ...... G06F 17/24; G06F 17/25; G06F 17/2235; G06F 17/211; G06F 17/241; G06F 17/248; G06F 17/30882; G06T 11/60; A63F 2300/5553; A63F 2300/6623
USPC .......................... 715/201, 202, 230, 255, 205
See application file for complete search history.

(56) References Cited

U.S. PATENT DOCUMENTS

| | | | | |
|---|---|---|---|---|
| 8,135,617 | B1* | 3/2012 | Agostino | G06Q 30/0241 705/1.1 |
| 2003/0229857 | A1* | 12/2003 | Sayuda | G06F 17/30896 715/249 |
| 2007/0220041 | A1* | 9/2007 | Van Luchene | G06Q 10/10 |
| 2013/0054613 | A1* | 2/2013 | Bishop | 707/748 |

\* cited by examiner

*Primary Examiner* — Patrick Riegler
*Assistant Examiner* — Jenq-Kang Chu
(74) *Attorney, Agent, or Firm* — Oblon, McClelland, Maier & Neustadt, L.L.P.

(57) ABSTRACT

Systems and methods for rendering an annotation graphic user interface (GUI) that encompasses external information related to a book term in a structured frame. An ebook includes pre-selected terms embedded with hyperlinks directing to an article contained by an external information source. Upon a user interaction with such a pre-selected term, raw information from the one or more articles is accessed and fed to a wireframe. The raw information is mapped to respective sections of the wireframe based on the field identifications attached to different segments of the raw information. As a result, an annotation GUI including the external information can be displayed in a consistent and orderly format.

18 Claims, 8 Drawing Sheets

PRESENTING EXTERNAL INFORMATION RELATED TO PRESELECTED TERMS IN EBOOK

CROSS REFERENCES

The present disclosure is related to the co-pending patent application titled "DETERMINING KEY EBOOK TERMS FOR PRESENTATION OF ADDITIONAL INFORMATION RELATED THERETO." filed on Jun. 21, 2013 and Ser. No. 13/924,339, which is herein incorporated by reference for all purposes.

TECHNICAL FIELD

The present disclosure relates generally to the field of electronic books, e.g., ebooks, and, more specifically, to the field of ebook presentation and user interfaces with ebooks.

BACKGROUND

When reading a conventional or an electronic book, a user often encounters interesting or strange terms that he or she wants to have more knowledge about, in addition to what the book itself presents. Mostly likely, the knowledge is readily available on the Internet. For example, online encyclopedia databases, such as Wikipedia, are popular resources that contain a very large amount of information covering almost every conceivable subject matter. Conventionally, the user can find a computing device connected to the Internet, open an internet browser to visit Wikipedia, and then submit his or her search term to get the relevant information on the book term. The user may find the process cumbersome and interruptive and so may give up the intention for a deep dive experience.

"Wikification" refers to the task of automatically linking text-based content to Wikipedia entries corresponding to terms mentioned in the text. Common terms of interest include people, places, organizations and similar categories. Typically a Wikification process involves implementation of two primary steps: (1) detection of suitable candidate terms that are potentially interesting to a user, and (2) disambiguation of some candidate terms that may match to several Wikipedia entries, or webpages.

However, an entry in the Wikipedia or similar information source sites usually includes some segment of information with low relevancy which an average user can hardly find useful even for a deep dive experience. Also, because relevant information may be acquired in more than one entry from either a single or from multiple information sources, presenting these scattered relevant information in its raw form, such as in different pages, inconsistent text formats, and varying categories of content, can make a deep dive experience inefficient and unpleasant.

SUMMARY OF THE INVENTION

Therefore, it would be advantageous to provide an automatic process for selecting relevant information from linked webpage(s) to annotate a selected term and presenting an on-situ annotation to a user in an organized fashion.

Accordingly, embodiments of the present disclosure employ a computer implemented method of rendering an annotation graphic user interface (GUI) that encompasses an aggregation of external information related to a book term in a structured frame. An ebook presented to a user includes pre-selected terms embedded with hyperlinks directing to one or more articles contained by one or more external information sources. Upon a user interaction with such a pre-selected term, raw information from the one or more articles is accessed and fed to a wireframe. The wireframe comprises a plurality of predefined sections arranged in a predetermined layout, where each section defines a field with respect to external information to be included. The raw information is mapped to respective sections of the wireframe based on the field identifications attached to different segments of the raw information. As a result, an annotation GUI, e.g., a stack, including the external information can be displayed in a consistent and orderly format. Therefore, the user can advantageously take the shortcut to acquire additional information related to the preselected term through the annotation GUI. Furthermore, sections with no eligible information provided by the raw information may be hidden from the annotation GUI presentation. Thus, the annotation can be advantageously presented in a single display page that only incorporates very pertinent information to the selected term.

In one embodiment of the present disclosure, a computer implemented method of presenting information related to select terms in an electronic book comprises: (1) displaying a passage of the electronic book on a electronic device, the passage comprising a select term embedded with a hyperlink that is associated with one or more documents from an information source site; (2) accessing the one or more documents from the information source site responsive to a user interaction with the select term; (3) accessing a predetermined template that comprises a plurality of sections arranged in respective page locations, each section corresponding to a predetermined field; (4) selecting relevant information from the one or more documents based on the predetermined template; and (5) rendering a graphic user interface (GUI) on the electronic device, wherein the GUI comprises a page display for the select term, wherein the page display comprises the relevant information assigned to corresponding sections of the predetermined template. The select term may be preselected automatically and presented in a passage of the electronic book with a visual attribute indicating presence of the hyperlink. The visual attribute is selected from a group consisting of: a highlight, an underline, a text color, a font, and a combination thereof. The information source site may be a website and is selected from a group consisting of a digital encyclopedia database, a local information database, a website hosted by another user, and a combination thereof. The plurality of sections may correspond to a plurality of predetermined fields comprising one or more of a header, a description, a summary biography, social media links, a list of books of an author, an image, related websites, related information, and quotations, respectively. The relevant information may be classified into a plurality of fields that are respectively identified with field indexes. The selecting comprises mapping the relevant information to the corresponding sections of the predetermined template by correlating the plurality of predetermined fields with the field indexes. The predetermined template may be generic with respect to the select terms of the electronic book. A rendering size and a number of the plurality of fields may be dependent on an operating system associated with the electronic device. The sections for which no content is provided by the relevant information may be hidden from presentation.

In another embodiment of present disclosure, a non-transitory computer-readable storage medium embodying instructions that, when executed by a processing device, cause the processing device to perform a method of rendering a annotation page for a select term in an electronic document that is presented on a display device, the method comprising: (1) displaying the electronic document on an electronic reader device, the electronic document comprising a selected term associated with an embedded hyperlink directing to one or more articles contained by an external information source, wherein the one or more articles comprises a plurality of indexed fields; (2) accessing the one or more article through the hyperlink in response to a user interaction with the selected term; (3) accessing a preset page pattern comprising a plurality of sections arranged in respective page locations, wherein the plurality of sections correspond to a plurality of pattern fields respectively; (4) determining eligible information from the document based on the plurality of pattern fields; and (5) displaying a graphic user interface (GUI) on the display device, wherein the GUI comprises an annotation page having the eligible information mapped to corresponding sections of the preset page pattern.

In another embodiment of present disclosure a system comprises: a processor; a network circuit; and a memory coupled to the processor and comprising instructions that, when executed by the processor, cause the processor to perform an automated method of annotating a selected term in an electronic book, the method comprising: (1) displaying a passage of the electronic book on a electronic device, the passage comprising a selected term embedded with a hyperlink that is associated with one or more documents from an information source site; (2) accessing the one or more documents from the information source site responsive to a user interaction with the selected term through the network circuit; (3) accessing a predetermined template that comprises a plurality of sections arranged in respective page locations, each section corresponding to a predetermined field; (4) selecting relevant information from the one or more documents based on the predetermined template; and (5) rendering a graphic user interface (GUI) on the electronic device, wherein the GUI comprises an annotation page for the selected term, wherein the annotation page comprises the relevant information assigned to corresponding sections of the predetermined template.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Presenting External Information Related to Preselected Terms in Ebook

Figure 1:
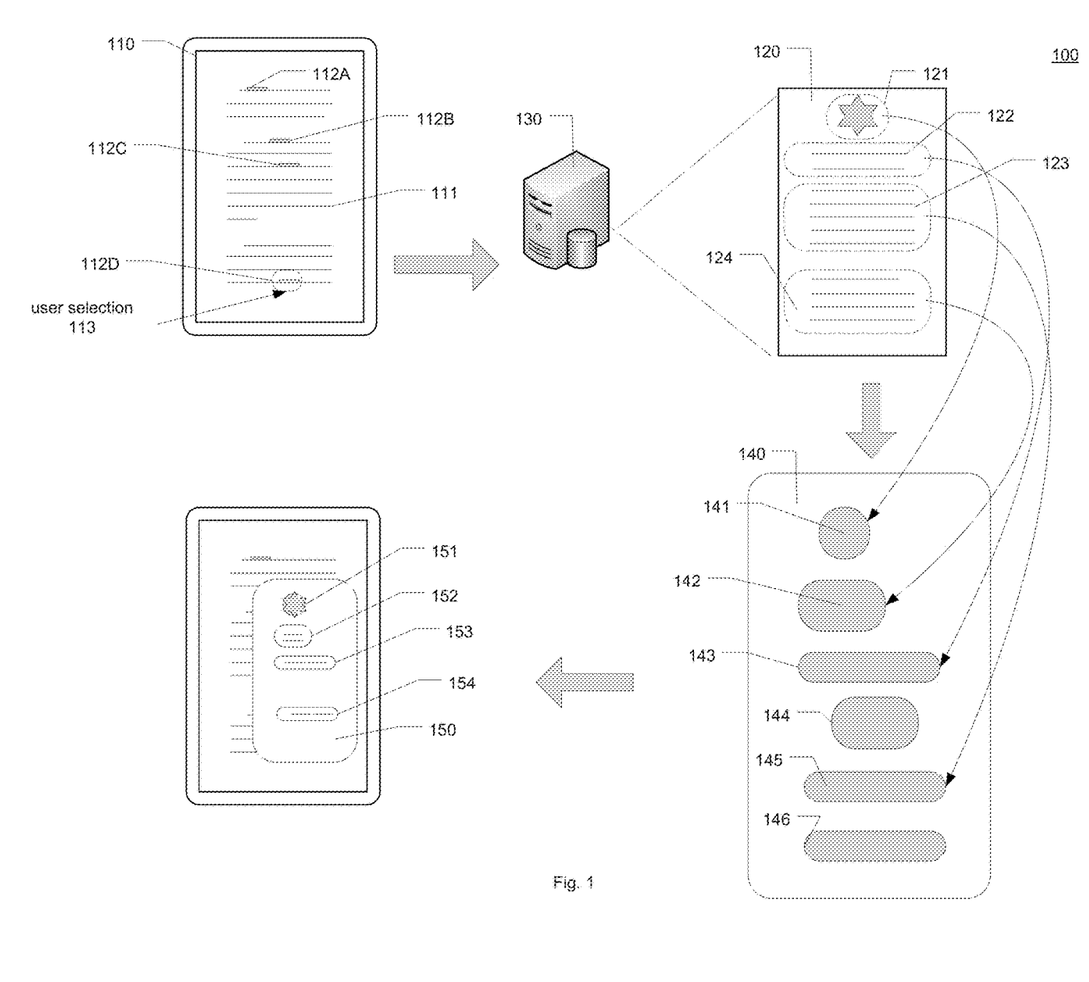
FIG. 1 is a diagram depicting an exemplary process of presenting an on-situ annotation for a preselected item during a user reading experience on an ebook in accordance with an embodiment of the present disclosure.

FIG. 1 is a diagram depicting an exemplary process 100 of presenting an on-situ annotation for a preselected item during a user reading experience on an ebook in accordance with an embodiment of the present disclosure. In FIG. 1, an electronic reader device 110 displays a passage 111 of the ebook, e.g., in a reading experience graphic user interface (GUI). The presented passage encompasses four pre-selected terms 112A-112D displayed with distinctive visual effects indicative of the availability of annotation. Each preselected term is embedded with one or more hyperlinks directing to one or more documents, e.g., webpages, in an information source site, e.g., Wikipedia.

In the illustrated example, a user interaction with the term 112D prompts the electronic reader 110 to visit the database server 130 for accessing the external information provided by the document 120 via embedded hyperlinks. The document 120 has four segments of information 121, 122, 123, and 124, which may be attached with respective field indexes indicating fields of the information, such as image, overview, history, references, external links, related information, timeline, and etc.

The document 120 is fed to a predefined layout template, for example a wireframe 140, designed to select and organize the external information based on a predetermined pattern. The wireframe 140 may include several sections organized in respective page locations and corresponding to respective fields of information to be populated. The sections in the wireframe 140 may be aligned with field indexes of the webpage to receive information from corresponding fields of the webpage. According to the illustrated example, the wireframe 140 includes 6 sections 141-146, and sections 141, 142, 143 and 145 are populated with information from segments 121, 124, 122, and 123, respectively, through a mapping process. On the other hand, the webpage 120 contains no eligible information for sections 144 and 146 and therefore can be removed from or made invisible in the resultant annotation GUI for the selected term.

Accordingly, the exemplary annotation GUI 150 is generated and comprises four sections of information 151-154 with the content derived from segments 121-124 in the webpage 120 and arranged in a pattern consistent with the wireframe 140. As will be appreciated by those skilled in the art, the annotation GUI window in accordance with the present disclosure can be presented in any suitable fashion. For example, it can overlay on the reading experience GUI and occupy a portion, e.g., approximately about %, of the viewing area of the electronic device. The annotation GUI 150 window may initially display a portion of the window and allow a user to expand the window size or revert back to the reading experience GUI by closing the GUI window.

The present disclosure is not limited to any specific mechanism of identifying terms, or key-terms, for annotation. For instance, the list of the annotation terms may be generated automatically in accordance with relatedness to a topic of a chapter of the ebook. Further, the present disclosure is not limited by any mechanism of mining relevant external information from external information source sites and establishing hyperlinks thereto. In some embodiments, the hyperlinks may result from a wikification process including a disambiguation process.

The preselected terms may comprise any type of expression recognizable by a computer, such as a word, a phrase, a symbol, etc. They may be presented in a passage in conjunction with any suitable type of indicative feature, such as a highlight, an underline, a text color, a font, and a combination thereof. In some embodiments, the indicative feature may be designed to be subtle so as not to disturb a user's normal reading experience. In some embodiments, the reading experience GUI may be configured to allow a user to enable or disable the annotation function. If disabled, the indicative features may be concealed and/or the hyperlinks may be deactivated.

It is appreciated that any suitable local or remote database server may act as an information source, to provide pertinent annotation for selected terms in accordance with the present disclosure. Also, any suitable method can be used to retrieve information from an information source for purposes of practicing the present disclosure. More than one information source accessible to a public reader can be used to provide annotation for an ebook by virtue of network connections, e.g. WAN, LAN, or WiFi. To name a few examples, the information website can be any well-known information source, such as Wikipedia, Baidu Baike, Canadian Encyclopedia. Credo Reference, EcuRed, or Grolier Multimedia Encyclopedia. The information sources may contain image, video, or audio content, in addition to text-related content that are presentable on an electronic device.

The present disclosure is not limited to any entry point GUI that comprises a clickable object corresponding to an annotation GUI. A user may open an annotation GUI by selecting a corresponding clickable object from a key-term summary GUI, from an overview GUI for the ebook or a chapter of the book, as well as from a passage in a reading experience GUI.

Figure 2:
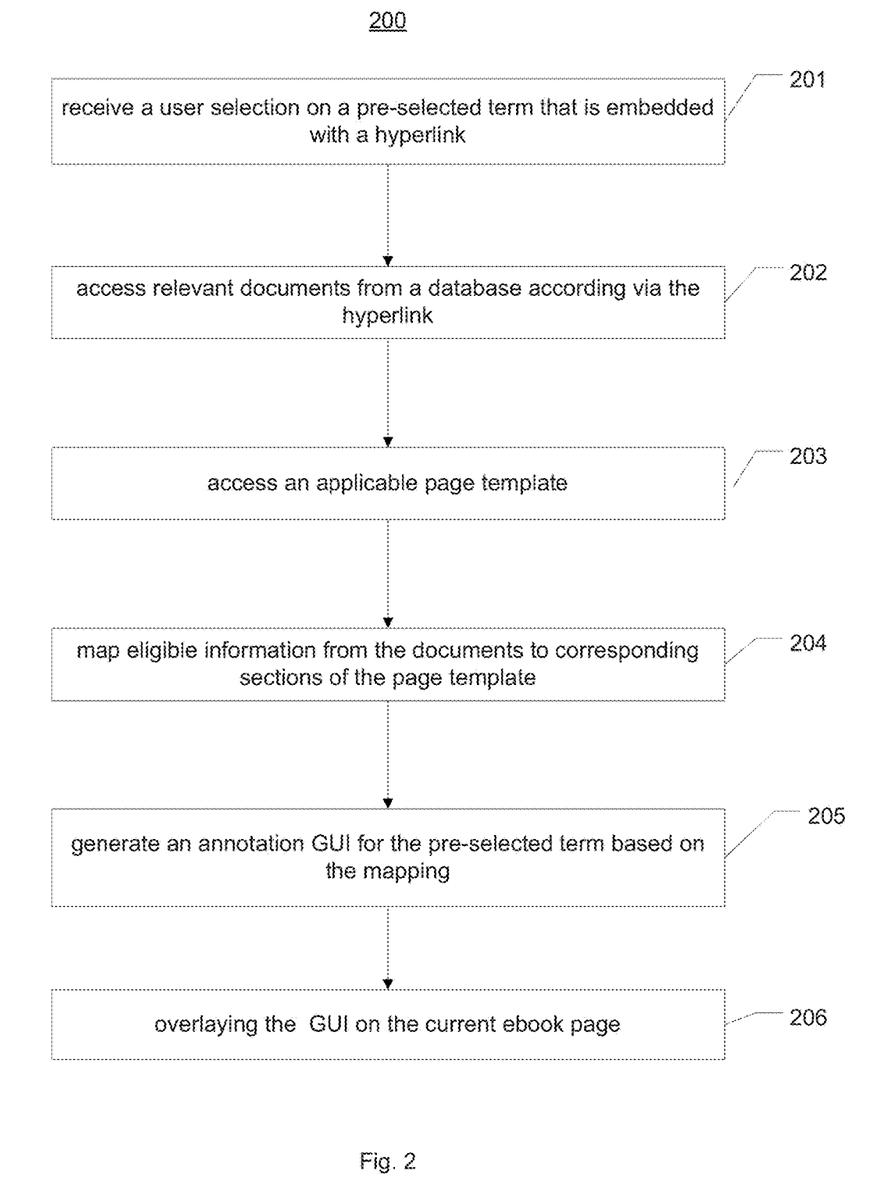
FIG. 2 is a flow chart depicting an exemplary computer implemented method of rendering an annotation GUI for a preselected term in an ebook in accordance with an embodiment of the present disclosure.

FIG. 2 is a flow chart depicting an exemplary computer implemented method 200 of rendering an annotation GUI for a preselected term in an ebook in accordance with an embodiment of the present disclosure. At 201, an electronic reader device may receive user interaction with a preselected term that is embedded with a hyperlink. The preselected term may be encompassed in an overview GUI, a term summary GUI, or a reading experience GUI for instance. At 202, through the hyperlink, an external document including relevant information hosted by a database is accessed in any suitable mechanism. At 203, an applicable annotation page template, e.g., a stack wireframe, can be accessed to process the external document. In some embodiments, the page template may be generic with respect to all types of terms. In some other embodiments, specific page templates with different fields and layouts may be available for different types of terms, such as symbols, persons, places, themes, and concepts. In this case, a matching page template is first determined to process the external document.

At 204, eligible information from the documents are selected and mapped to corresponding sections of the page template in accordance with respective field identifications attached to the page template and the documents. At 205, an annotation GUI, e.g., a stack, is generated for the selected term based on the mapping. At 206, the annotation GUI is displayed on the electronic device, e.g., overlaying a portion of current GUI.

The computer implemented method can be used in a variety of devices running an electronic book reader software, such as desktop computer, a laptop computers, handheld personal digital assistants (PDAs), a tablet, a smart phones with displays, and so forth.

Figure 3A:
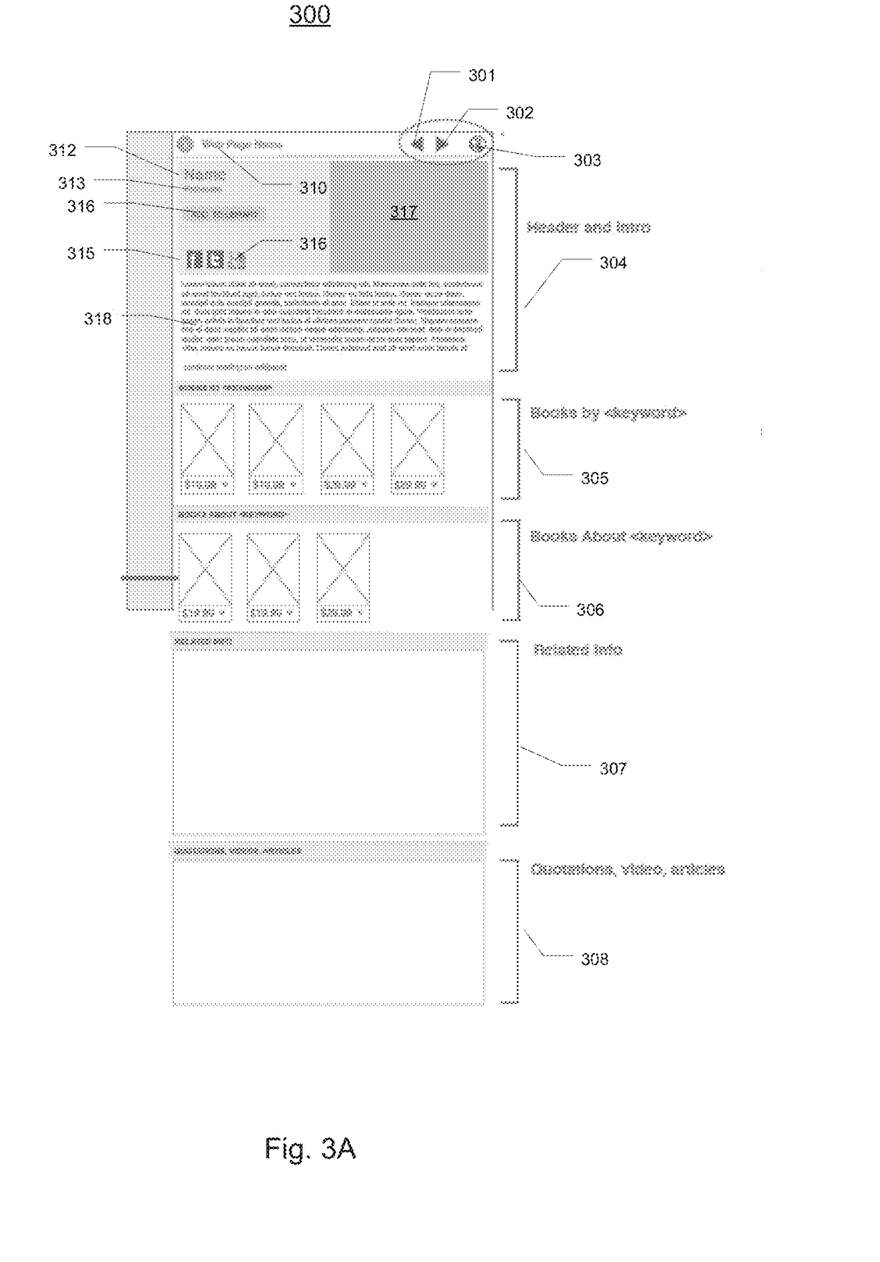
FIG. 3A is a diagram illustrating an exemplary configuration of an annotation GUI wireframe that can be implemented on a tablet display device to select and organize relevant information obtained from an external information source in accordance with an embodiment of the represent disclosure.

FIG. 3A is a diagram illustrating an exemplary configuration of an annotation GUI wireframe 300 that can be implemented on a tablet display device for instance to arrange relevant information obtained from an external information source in accordance with an embodiment of the represent disclosure. The wireframe 300 can be implemented as part of the ebook software application program on a tablet or any suitable device, for example. In the illustrated example, the wireframe 300 includes several sections labeled as "Header and intro" 304, "Books by <keyword>" 305, "Books About <keyword>" 306, "Related Info" 307, and "Quotation, video articles" 308. Also included are "Back/Forward" buttons 301 and 302 placed on the top edge that allow a user to browse within a web view and open in application browser view button 303.

The "Header and intro" section 304 is placed on the top of the page to receive information regarding the keyword name 312, profession 313, social network links 315, Google map link 314, picture 317, as well as a overview description 318. The "Add to library" button 316 allows a user to save the annotation page to the electronic device for future reference. If the keyword represents a writer's name, the "Books by <keyword>" section 304 may follow the "Header and intro" section 304 include books written by the writer. "Books About <keyword>" section 306 may include books in which the keyword is mentioned or books about the keyword. The "Related Info" 307 may include a few widgets, including notable works by person, influenced by, influenced, peers, tourist attractions near travel places, film about the keyword, and etc. The "Quotation, video articles" section 308 may include quotations, videos, articles, website, and search in Google. The wireframe may include any additional or different section regarding any suitable type of information that can be provided by any accessible information source. In the illustrated example, the stack wireframe is configured to generate an annotation GUI in a flow view form. The present disclosure is not limited to any particular layout.

Figure 3B:
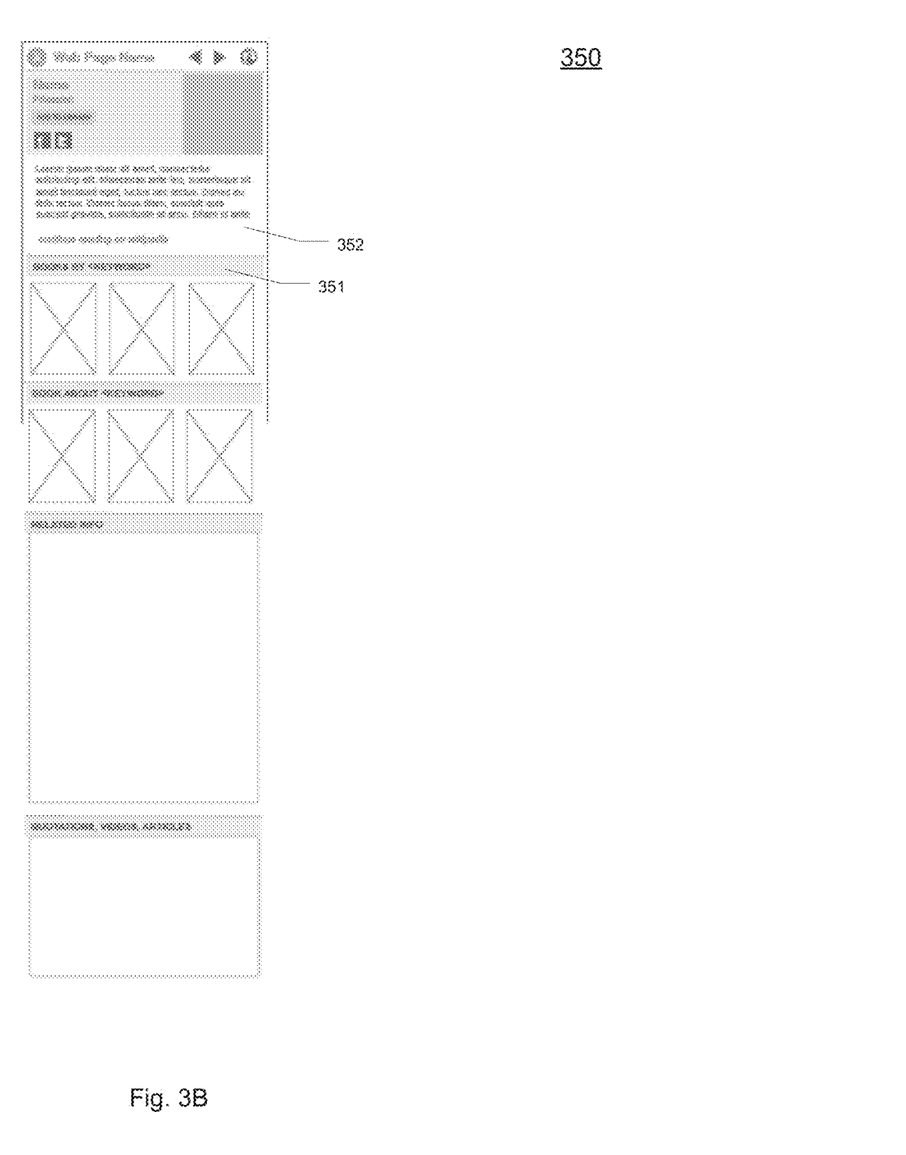
FIG. 3B is a diagram illustrating an exemplary configuration of an annotation GUI wireframe that can be implemented on a smart phone device to select and organize relevant information obtained from an external information source in accordance with an embodiment of the represent disclosure.

Based on the display capability of the device, e.g., depending on an operation system associated with the display device, or the model of a display device, the wireframe in accordance with the present disclosure can vary and yet perform substantially the same annotation and presentation functions. FIG. 3B is a diagram illustrating an exemplary configuration of a stack wireframe 350 that can be implemented on a smart phone device to select and organize relevant information obtained from an external information source in accordance with an embodiment of the represent disclosure.

Figure 3C:
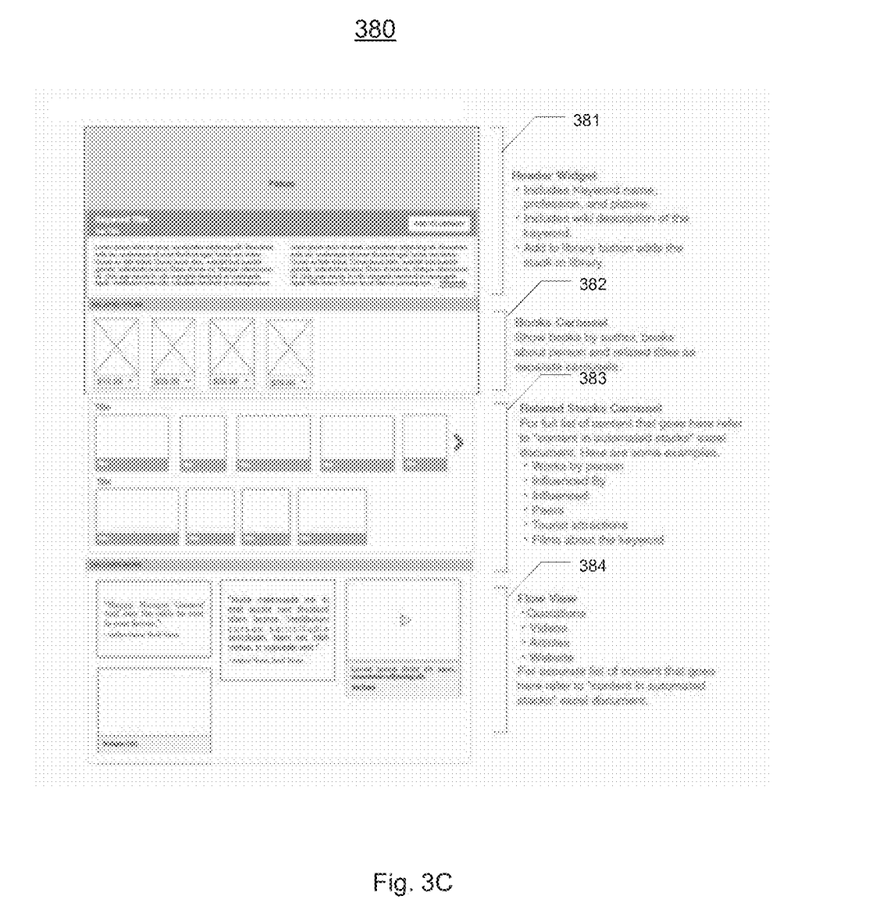
FIG. 3C is a diagram illustrating an exemplary configuration of an annotation GUI wireframe that can be implemented on a desktop computer to select and organize relevant information obtained from an external information source in accordance with an embodiment of the represent disclosure.

FIG. 3C is a diagram illustrating an exemplary configuration of an annotation GUI wireframe 380 that can be implemented on a desktop computer to select and organize relevant information obtained from an external information source in accordance with an embodiment of the represent disclosure. Provided with the same document accessed from an information source site, wireframes 300, 350 and 380 can generate similar but different annotation GUIs. As illustrated, the "Header Widget" section 381 is placed on the top of the page to receive information regarding the keyword name, profession, Wikipedia description of the keyword, and picture. The "Add to library" button allows a user to save the annotation page to the electronic device for future reference. The "Books Carousel section" 382 may follow the "Header and intro" section 381 and include books written by the writer if the writer's name is the keyword, books about the person, and related titles as separate carousels, or sections. The "Related Stacks Carousel" section 383 may include work by person, influenced by, influenced, peers, tourists attractions, and films about the keyword, and etc. The "Flow view" section 384 may present a flow view of quotations, videos, articles, websites, and etc.

Figure 4:
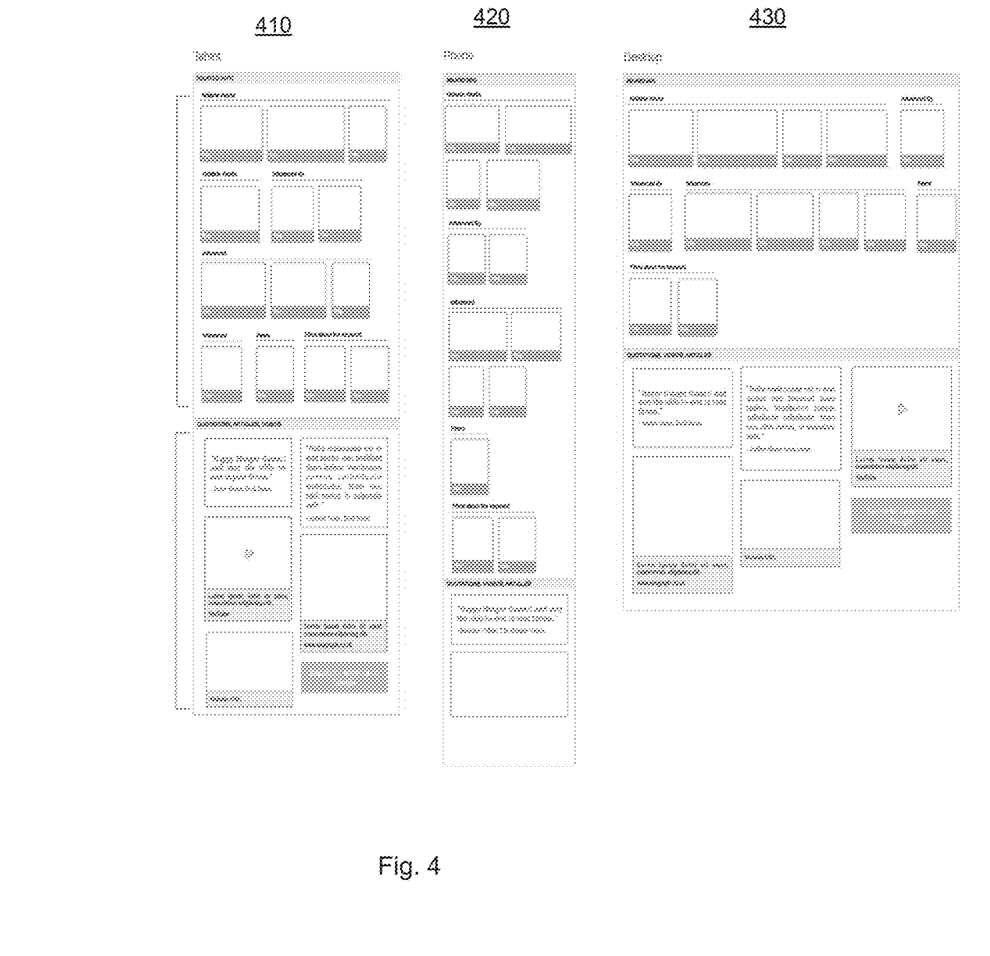
FIG. 4 is a diagram illustrating the exemplary configurations of "Related Info" section and "Quotation, video articles" section in respective wireframes designed for a tablet, a phone, and a desktop in accordance with an embodiment of the present disclosure.

Among the three, the wireframe 350 for a smart phone has the most concise design which permits least amount of information to be presented in each section at one time than the wireframes 300 and 380. For example, the "Books by <keyword>" section 351 in wireframe 350 only has spaces allocated for three books, while its counterparts 383 in wireframe 380 has space allocated for five books, and 305 in wireframe 300 has space allocated for four books. For another example, the "Header and intro" section 381 in wireframe 380 allows for more elaborate description of the keyword then its counterparts 352 in wireframe 350 and 381 in wireframe 380. FIG. 4 is a diagram illustrating the exemplary configurations of "Related Info" section and "Quotation, video articles" section in respective wireframes designed for a tablet 410, a phone 420, and desktop 430 in accordance with an embodiment of the present disclosure. With respect to the "Related info" sections, the wireframes 410, 420, and 430 may set the height fixed for each tile in a respective wireframe and the width variable depending on the image size. Each subsection, such as "notable works," and "notable works," are labeled with their sub headers. The wireframes 410, 420, and 430 may specify to place as many tiles as can fit in a row, and show all the items available for each section before the next section starts.

With respect to the "Quotation, video articles" sections, the wireframes 410, 420, and 430 may set the column width fixed while the height variable depending on the content. The number of columns to be displayed may depend on the screen size of each device.

Figure 5:
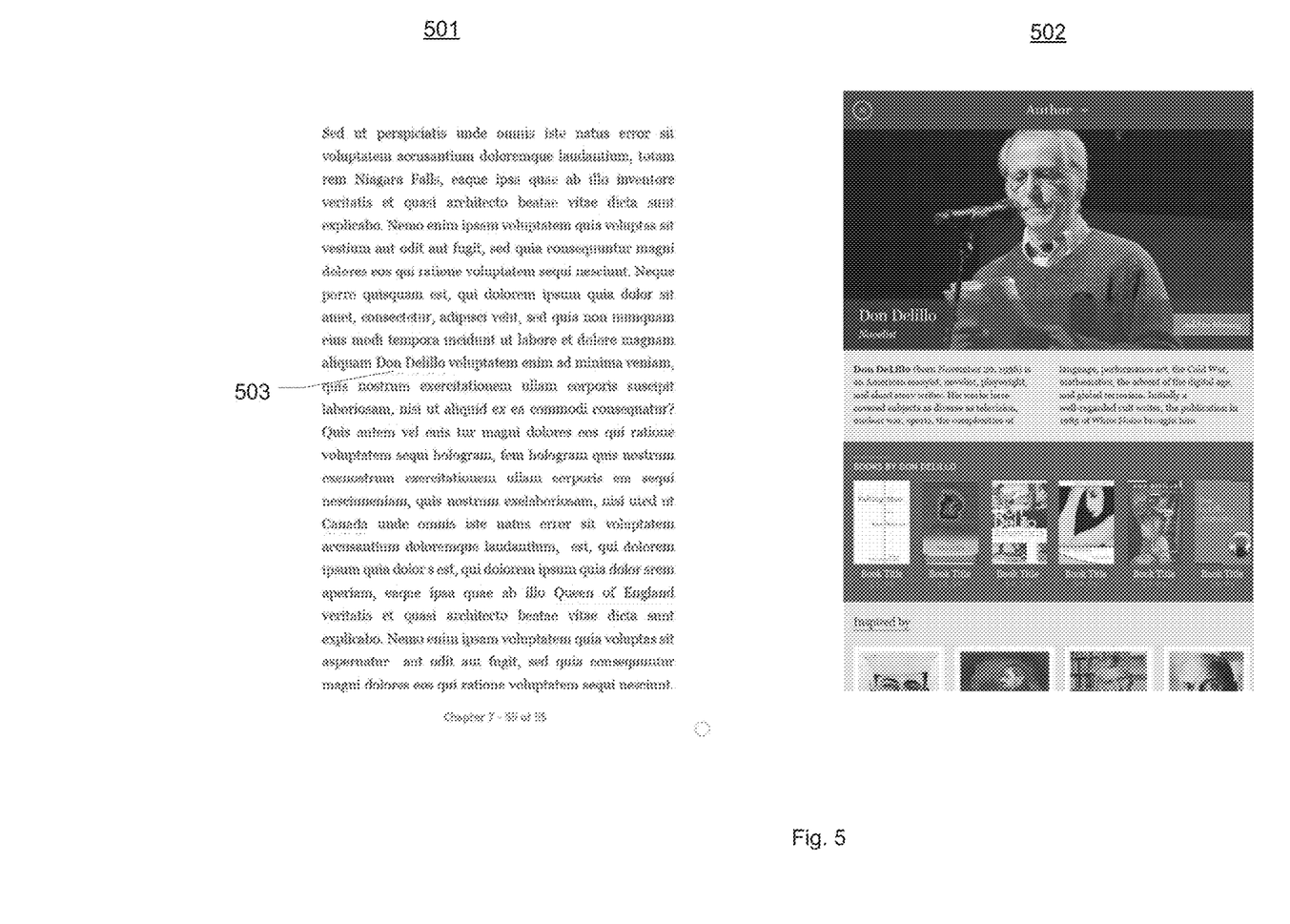
FIG. 5 illustrates an exemplary reading experience GUI comprising a preselected term and an exemplary annotation GUI generated in accordance with an embodiment of the present disclosure.
Figure 6:
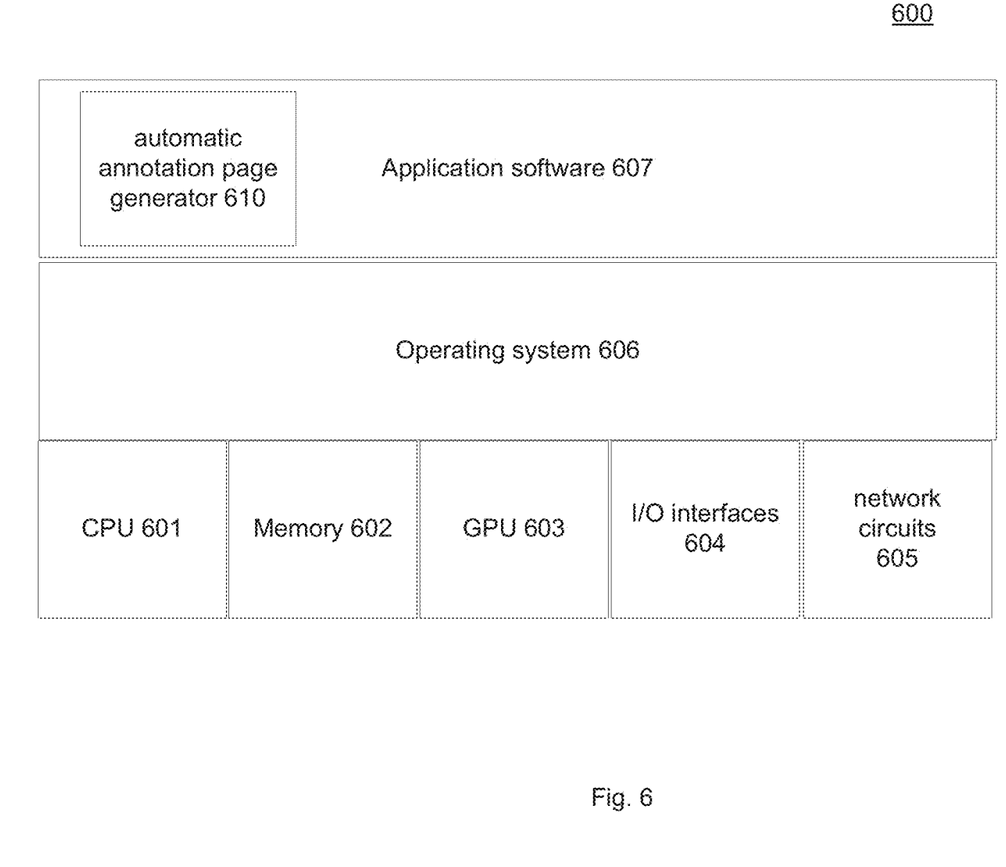
FIG. 6 is a block diagram illustrating an exemplary computing system including an automatic annotation GUI generator in accordance with an embodiment of the present disclosure.

FIG. 5 illustrates an exemplary reading experience GUI 501 comprising a preselected term and an exemplary annotation GUI 502 generated in accordance with an embodiment of the present disclosure. The annotation GUI 502 may be generated based on a wireframe that is similar with FIG. 3A, 3B or 3C. The reading experience GUI 501 contains an underlined term "Don Delillo" 503, upon selection of which the annotation GUI 502 can be displayed with information derived from a related Wikipedia page in a format defined by the corresponding wireframe. The annotation GUI 502 includes an image, a description of Don Delillo's life, books related to Don Delillo's, his biography, related information including genres and instruments, quotations including websites, and articles. FIG. 6 is a block diagram illustrating an exemplary computing system 600 including an automatic annotation GUI generator 610 in accordance with an embodiment of the present disclosure. The computing system 600 comprises a processor 601, a system memory 602, a GPU 603, I/O interfaces 604 and network circuits 605, an operating system 606 and application software 607 including the automatic annotation GUI generator 610 stored in the memory 602. When incorporating the user's configuration input and executed by the CPU 601, the automatic annotation GUI generator 610 can automatically access external information, process the information through a wireframe, and generate an annotation GUI window in accordance with an embodiment of the present disclosure. The annotation GUI generator 610 may perform various other functions as discussed in details with reference to FIG. 1-FIG. 5. As will be appreciated by those with ordinary skills in the art, the annotation GUI generator 610 can be a functional module integrated in a ebook reading software implemented in any one or more suitable programming languages that are known to those skilled in the art, such as C, C++, Java, Python, Perl, C#, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of presenting information related to select terms in an electronic book, said method comprising:
   displaying a passage of said electronic book on an electronic device, said passage comprising a select term embedded with a hyperlink that is associated with one or more documents from an information source site;
   accessing said one or more documents from said information source site responsive to a user interaction with said select term;
   accessing a predetermined generic template that comprises a plurality of sections arranged in respective page locations, each section corresponding to a predetermined field that is independent of content of said one or more documents, each section having a field index;
   selecting relevant information, which is classified into a plurality of fields that are respectively identified with field indexes, from said one or more documents based on said predetermined generic template by mapping said relevant information to said corresponding sections of said predetermined generic template by allocating the plurality of fields of the relevant information to corresponding sections of said predetermined generic template having corresponding field indexes;
   removing at least a section of the plurality of sections of said predetermined generic template without a corresponding field of the relevant information having a corresponding field index; and
   rendering a graphic user interface (GUI) on said electronic device, wherein said GUI comprises a page display for said select term, wherein said page display comprises said relevant information assigned to corresponding sections of said predetermined generic template.

2. The computer implemented method of claim 1, wherein said select term is pre-selected automatically, wherein further said select term is presented in a passage of said electronic book with a visual attribute indicating presence of said hyperlink, wherein said visual attribute is selected from a group consisting of: a highlight, an underline, a text color, a font, and a combination thereof.

3. The computer implemented method of claim 1, wherein said information source site is a website and is selected from a group consisting of a digital encyclopedia database, a local information database, a website hosted by another user, and a combination thereof.

4. The computer implemented method of claim 1, wherein said plurality of sections corresponds to a plurality of predetermined fields comprising one or more of a header, a description, a summary biography, social media links, a list of books of an author, an image, related websites, related information, and quotations, respectively.

5. The computer implemented method of claim 1, wherein said predetermined generic template is generic with respect to said select terms of said electronic book, and wherein further a rendering size and a number of said plurality of fields of said predetermined generic template are dependent an operating system associated with said electronic device.

6. The computer implemented method of claim 1 wherein said rendering comprises hiding sections for which no content is provided by said relevant information.

7. The computer implemented method of claim 1, wherein said rendering comprises: causing a portion of said page display to overlay a fragment of said passage, and causing additional portion of said page display to be visible in response to a user interaction with said page display, further comprising closing said GUI responsive to a user interaction.

8. A non-transitory computer-readable storage medium embodying instructions that, when executed by a processing device, cause the processing device to perform a method of rendering an annotation page for a select term in an electronic document that is presented on a display device, said method comprising:
   displaying said electronic document on an electronic reader device, said electronic document comprising a selected term associated with an embedded hyperlink directing to one or more articles contained by an external information source, wherein said one or more articles comprises a plurality of indexed fields;
   accessing said one or more articles through said hyperlink in response to a user interaction with said selected term;
   accessing a preset page pattern comprising a plurality of sections arranged in respective page locations, wherein said plurality of sections correspond to a plurality of pattern fields respectively, wherein each of said plurality of pattern fields is independent of content of said one or more articles, each section having a field index;
   determining eligible information, which is classified into a plurality of fields that are respectively identified with field indexes, from said one or more articles based on said plurality of pattern fields by mapping said eligible information to said corresponding sections of said plurality of pattern fields by allocating the plurality of fields of the eligible information to corresponding sections of said plurality of pattern fields having corresponding field indexes;
   removing at least a section of the plurality of sections of said plurality of pattern fields without a corresponding field of the eligible information having a corresponding field index; and
   displaying a graphic user interface (GUI) on said display device, wherein said GUI comprises an annotation page having said eligible information mapped to corresponding sections of said preset page pattern.

9. The non-transitory computer-readable storage medium of claim 8, wherein said selected term is pre-selected automatically based on a subject of said electronic document, and wherein said selected term is presented in said electronic document with a visual attributes.

10. The non-transitory computer-readable storage medium of claim 8, wherein a layout of said preset page pattern is customized with respect to an operating system associated with said display device.

11. The non-transitory computer-readable storage medium of claim 8, wherein said determining comprises matching said plurality of pattern fields respectively to said plurality of indexed fields of said one or more articles, and wherein said GUI is free of sections that are irrelevant to said eligible information.

12. The non-transitory computer-readable storage medium of claim 8, wherein said plurality of sections are populated with one or more predetermined widgets, said one or more predetermined widgets comprising a related information widget, a video widget, an article widget, a quotation widget, a website widget, and a search bar.

13. The non-transitory computer-readable storage medium of claim 8, wherein said external information source comprises a digital encyclopedia database.

14. The non-transitory computer-readable storage medium of claim 8, wherein said preset page pattern is independent of terms selected for annotations.

15. The non-transitory computer-readable storage medium of claim 8, wherein said displaying said graphic user interface (GUI) comprises overlaying a portion of said GUI in a predetermined size on said electronic document, and causing additional portion of said GUI to be displayed in response to a user interaction with said GUI.

16. A system comprising:
a processor,
a network circuit; and
a memory coupled to said processor and comprising instructions that, when executed by said processor, cause the processor to perform an automated method of annotating a selected term in an electronic book, said method comprising:
displaying a passage of said electronic book on an electronic device, said passage comprising a selected term embedded with a hyperlink that is associated with one or more documents from an information source site;
accessing said one or more documents from said information source site responsive to a user interaction with said selected term through said network circuit;
accessing a predetermined generic template that comprises a plurality of sections arranged in respective page locations, each section corresponding to a predetermined field that is independent of content of said one or more documents each section having a field index;
selecting relevant information, which is classified into a plurality of fields that are respectively identified with field indexes, from said one or more documents based on said predetermined generic template by mapping said relevant information to said corresponding sections of said predetermined generic template by allocating the plurality of fields of the relevant information to corresponding sections of said predetermined generic template having corresponding field indexes;
removing at least a section of the plurality of sections of said predetermined generic template without a corresponding field of the relevant information having a corresponding field index, and
rendering a graphic user interface (GUI) on said electronic device, wherein said GUI comprises an annotation page for said selected term, wherein said annotation page comprises said relevant information assigned to corresponding sections of said predetermined generic template.

17. The system of claim 16, wherein said selected term are pre-selected and are associated with said one or more documents automatically, and wherein further said selected term is presented in said electronic book with a visual attribute indicating availability of annotation.

18. The computer implemented method of claim 16, wherein said rendering comprises hiding sections for which no content is provided by said relevant information.

* * * * *